(12) United States Patent
Tessari et al.

(10) Patent No.: US 9,193,877 B2
(45) Date of Patent: Nov. 24, 2015

(54) WATERBORNE BASE COAT COMPOSITIONS HAVING A SPECIAL-EFFECT COLOR

(75) Inventors: Frank Tessari, Wuppertal (DE); Ralf Wilhelms, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 374 days.

(21) Appl. No.: 13/704,661

(22) PCT Filed: Jul. 25, 2011

(86) PCT No.: PCT/US2011/045148
§ 371 (c)(1),
(2), (4) Date: Dec. 17, 2012

(87) PCT Pub. No.: WO2012/015718
PCT Pub. Date: Feb. 2, 2012

(65) Prior Publication Data
US 2013/0115379 A1    May 9, 2013

Related U.S. Application Data

(60) Provisional application No. 61/368,022, filed on Jul. 27, 2010.

(51) Int. Cl.
| | | |
|---|---|---|
| *C09D 5/29* | (2006.01) | |
| *B05D 5/06* | (2006.01) | |
| *B05D 7/00* | (2006.01) | |
| *C09D 5/02* | (2006.01) | |
| *C09D 5/36* | (2006.01) | |
| *B05D 1/02* | (2006.01) | |

(52) U.S. Cl.
CPC .. *C09D 5/29* (2013.01); *B05D 5/06* (2013.01); *B05D 7/532* (2013.01); *C09D 5/028* (2013.01); *C09D 5/36* (2013.01); *B05D 1/02* (2013.01); *B05D 2201/00* (2013.01); *B05D 2202/00* (2013.01)

(58) Field of Classification Search
USPC .......................................... 524/501, 255, 523
See application file for complete search history.

(56) References Cited

U.S. PATENT DOCUMENTS

| | | | |
|---|---|---|---|
| 2003/0203991 A1* | 10/2003 | Schottman et al. ........... | 523/334 |
| 2005/0096421 A1* | 5/2005 | Watanabe et al. ............. | 524/439 |
| 2006/0100353 A1* | 5/2006 | Barsotti et al. ................ | 524/543 |

FOREIGN PATENT DOCUMENTS

| | | | |
|---|---|---|---|
| JP | 59-105032 A | * | 6/1984 |
| WO | WO 00/66675 A1 | * | 11/2000 |
| WO | WO 2006/138311 A1 | * | 12/2006 |

OTHER PUBLICATIONS

PCT/US2011/045148, International Preliminary Report on Patentability, Jan. 29, 2013, 6 pages.*

* cited by examiner

*Primary Examiner* — Vu A Nguyen
(74) *Attorney, Agent, or Firm* — Ingrassia Fisher & Lorenz, P.C.

(57) ABSTRACT

A waterborne base coat having a special-effect color and which contains aqueous microgel as binder, 0.5 to 2 wt.-% of poly(meth)acrylic acid thickener and 2 to 7 wt.-% of non-ionically emulsified EVA copolymer wax with a drop point of the wax portion of 80 to 110° C., the wt.-% in each case calculated as solids and relative to the solids content of the waterborne base coat.

5 Claims, No Drawings

WATERBORNE BASE COAT COMPOSITIONS HAVING A SPECIAL-EFFECT COLOR

FIELD OF THE INVENTION

The invention relates to waterborne base coat compositions (in the following description and the claims also called "waterborne base coats") having a special-effect color. The waterborne base coats can be used for the production of the base coat layer in a process for the production of a base coat/clear coat two-layer coating having a special-effect color on a substrate, in particular on an automotive substrate.

DESCRIPTION OF THE PRIOR ART

In the description and the claims the term "special-effect color" is used. A base coat/clear coat two-layer coating with a special-effect color is one exhibiting a so-called flop effect. "Flop effect" means the behavior of a coating to change lightness and/or color dependent on the observation angle (viewing angle). Said behavior is a result of oriented special-effect pigments or flake pigments contained in a coating layer applied from a correspondingly pigmented coating composition.

Base coat/clear coat two-layer coatings with special-effect colors are well-known, in particular in automotive coating. Examples include base coat/clear coat two-layer coatings with a metallic color and/or with a mica color.

Accordingly, in the sense of the present invention, a waterborne base coat with a special-effect color is a waterborne coating composition from which the base coat layer of a base coat/clear coat two-layer coating having a special-effect color can be applied.

Today's automotive coatings generally comprise an electrodeposition coating (EDC) primer, a primer surfacer layer (filler layer) as intermediate coating layer and a top coat comprising a wet-on-wet applied color- and/or special effect-imparting base coat layer and a protective, gloss-imparting clear coat layer (see A. Goldschmidt and H.-J. Streitberger, BASF Handbook on Basics of Coating Technology, Vincentz, Hannover, 2003, pages 702-705).

Waterborne base coats having a special-effect color which contain aqueously dispersed microgel particles (hereinafter also called "aqueous microgel") as binder have been disclosed in the patent literature, for example, in WO 01/72909 A2, WO 2006/118974 A1, EP-A-1 389 627, GB-A-2 206 591, US 2003/0220446, US 2003/0204013, US 2006/0128887, US 2006/0128859, US 2006/0211813, U.S. Pat. Nos. 4,403,003, 4,539,363, 4,945,128, 5,075,372, 5,412,023, 5,977,258, 6,013,324, 6,046,259, 6,538,059 and 6,770,702. Said microgel particles are organic polymer microparticles which may be comprised of one or more polymer phases, wherein at least one of the polymer phases is crosslinked. Aqueously dispersed core-shell polymer particles the core and/or the shell polymer whereof is/are crosslinked represent examples of such multi-phase microgel particles.

SUMMARY OF THE INVENTION

It has now been found that it is possible to improve the appearance (visual impression) of the clear coat layer of base coat/clear coat two-layer coatings the base coat layer of which has been applied from a waterborne special-effect color base coat containing aqueous microgel binder. The improvement in appearance, in particular an improved gloss of the clear coat layer can be obtained when such waterborne base coat contains a specific additive combination of poly(meth)acrylic acid thickener and non-ionically emulsified EVA (ethylene/vinyl acetate) copolymer wax with a drop point of the wax portion of 80 to 110° C. The improved appearance of the finished clear coat layer can visually be perceived; however, it can also be determined as a minimized short wave (SW) and/or minimized dullness (du, Wa, Wb) of the clear coat surface structure. The SW and dullness can be determined with the measuring device Wavescan DOI from BYK-Gardner.

The term "(meth)acryl" used herein means methacryl and/or acryl. In the description and the claims the term "drop point" (also called "dropping point") is used. Drop point and melting point shall not be confused with each other, although both temperature points describe the same or almost the same, namely the temperature at which a material passes from a solid or semi-solid state into the liquid state. Melting point and drop point measurements of a material may lead to the same result; however, the drop point may also be slightly higher or slightly lower than the melting point. The drop point is determined according to DIN ISO 2176 (May 1997).

The invention is directed to waterborne base coats having a special-effect color and which contain aqueous microgel as binder, 0.5 to 2 wt.-% (weight-%) of poly(meth)acrylic acid thickener and 2 to 7 wt.-% of non-ionically emulsified EVA copolymer wax with a drop point of the wax portion of 80 to 110° C., the wt.-% in each case calculated as solids and relative to the solids content (overall solids) of the waterborne base coats.

The invention is also related to a process for the formation of a base coat/clear coat two-layer coating having a special-effect color on a substrate, wherein the base coat layer is applied from a waterborne base coat of the present invention.

DETAILED DESCRIPTION OF THE EMBODIMENTS

The waterborne base coats of the present invention are aqueous coating compositions having a solids content of 15 to 25 wt.-%. In addition to water, a resin solids content comprising the aqueous microgel binder, a pigment content, the poly(meth)acrylic acid thickener and the non-ionically emulsified EVA copolymer wax, the waterborne base coats may contain one or more of the following optional components: fillers (extenders), organic solvents, additives other than (other than=different from) poly(meth)acrylic acid thickeners and also other than non-ionically emulsified EVA copolymer waxes. The waterborne base coats have a ratio by weight of pigment content to resin solids content of, for example, 0.08:1 to 0.6:1.

The term "solids content" used in the present description and the claims means the sum of the non-volatile components of a coating composition, i.e. the sum of the resin solids, pigments, fillers and non-volatile additives. The rest of the coating composition is formed by volatile components, i.e. water, optionally present organic solvents and optionally present volatile additives.

The term "resin solids content" used in the present description and the claims means the sum of the solids contributions of the coating binders (binder solids) and the solids contributions of crosslinkers (crosslinker solids, crosslinking agent solids) optionally contained in a coating composition. The coating binders comprise the aqueous microgel binder (calculated without water) and they include paste resins optionally contained in the coating composition.

The term "pigment content" used in the present description and the claims means the sum of all the pigments contained in a coating composition. The pigment content does not comprise fillers. The term "pigments" is used here as in DIN 55944 (Nov. 2003) and covers, in addition to special-effect pigments, inorganic white, colored and black pigments and organic colored and black pigments. At the same time, therefore, DIN 55944 distinguishes between pigments and fillers.

The waterborne base coats of the present invention contain anionically and/or non-ionically stabilized aqueous binder systems. Anionic stabilization is preferably achieved by at least partially neutralized carboxyl groups in the binder, while non-ionic stabilization is preferably achieved by lateral and/or terminal polyethylene oxide units (polyethylene glycol structures) in the binder. The waterborne base coats may be physically drying or crosslinkable by formation of covalent bonds. The crosslinkable waterborne base coats forming covalent bonds may be self- or externally crosslinkable systems.

The waterborne base coats of the present invention contain one or more conventional water-dilutable film-forming binders, wherein at least one of said binders is an aqueous microgel. The aqueous microgel is contained in the waterborne base coats in a proportion of, for example, 20 to 70 wt.-% of the binder solids. In an embodiment, the proportion of aqueous microgel is 20 to 50 wt.-% of the binder solids.

Suitable aqueous microgels that can be used to form the waterborne base coats of the present invention include those disclosed in the patent literature cited in the section "Description of the Prior Art". The microgel preferably contains appropriate functional groups, such as hydroxyl groups, whereby they can become crosslinked, after application of the waterborne base coat, by means of a crosslinking agent.

The aqueous microgels may be composed of various types of crosslinked polymers. Of particular interest for the purposes of this invention are crosslinked (meth)acrylic microgel particles. Preparation of such (meth)acrylic microgels may be carried out by methods that are well known and routinely practiced by those of ordinary skill in the art. Typically, the microgels are (meth)acrylic addition polymers mainly derived from one or more alkyl (meth)acrylates, optionally together with other ethylenically unsaturated copolymerizable monomers like styrene and vinyl esters. Suitable alkyl (meth)acrylates include, without limitation, alkyl (meth) acrylates each having 1-18 carbon atoms in the alkyl group. Since the (meth)acrylic microgel is required to be formed with internal crosslinking, there may be included in the monomers from which the (meth)acrylic microgel is derived a minor proportion of a monomer which is polyfunctional with respect to the polymerization reaction, such as ethylene glycol di(meth)acrylate, allyl (meth)acrylate or divinylbenzene.

Alternatively, there may be included in the monomers minor proportions of two other monomers carrying pairs of functional groups which can be caused to react with one another either during or after polymerization, such as epoxy and carboxyl (as for example, in glycidyl methacrylate and (meth)acrylic acid), anhydride and hydroxyl, or isocyanate and hydroxyl. There also is preferably included in the monomers from which the (meth)acrylic microgel is derived minor amounts of a hydroxyl containing monomer for crosslinking purposes after application of the waterborne base coat, for example, a hydroxy alkyl (meth)acrylate.

Acid functional monomers such as (meth)acrylic acid are also preferably included in the monomer mix to anionically stabilize the (meth)acrylic microgels in the aqueous base coat by converting such groups to a suitable salt by reaction with a base, such as dimethylaminoethanol. Stability in aqueous base coat can also be achieved through the use of surfactants or macromonomers that contain water-soluble nonionic stabilizers such as materials that contain polyethylene glycol structures.

In addition to the aqueous microgel, the waterborne base coats of the present invention contain at least one water-dilutable "non-microgel" binder. Examples of suitable binders are conventional water-dilutable binders familiar to the person skilled in the art, such as water-dilutable polyester resins, water-dilutable (meth)acrylic copolymer resins, water-dilutable polyester/(meth)acrylic copolymer hybrids, water-dilutable polyurethane resins and water-dilutable polyurethane/(meth)acrylic copolymer hybrids.

The waterborne base coats of the present invention may optionally also contain crosslinking agents if the binders are not self-crosslinkable or physically drying. Selection of the optionally contained crosslinking agents depends, in a manner familiar to the person skilled in the art, on the functionality of the binders, i.e., the crosslinking agents are selected in such a way that they exhibit a reactive functionality complementary to the functionality of the binders. Examples of such complementary functionalities between binder and crosslinking agent are: carboxyl/epoxy, hydroxyl/methylol ether and/or methylol (methylol ether and/or methylol preferably, as crosslinkable groups of amino resins, in particular, melamine resins). Examples of crosslinking agents include free or blocked polyisocyanates and amino resins, for example, melamine resins. The crosslinking agents may be used individually or in combination. The weight ratio between crosslinking agent solids and binder solids amounts, for example, to 10:90 to 40:60.

As already mentioned, the waterborne base coats of the present invention have special-effect colors. Accordingly, they comprise an appropriate amount of at least one special-effect pigment; the solids contents of the waterborne base coats comprise, for example, 8 to 25 wt.-% of one or more special-effect pigments. Examples of special-effect pigments are those flake pigments or platelet pigments imparting to a coating a viewing angle-dependent color and/or lightness flop, such as, non-leafing metal pigments like in particular, aluminum flake pigments, interference pigments, such as, e.g., metal oxide-coated metal pigments, e.g., iron oxide-coated aluminum, coated micas, such as, e.g., titanium dioxide-coated mica, pigments producing a graphite effect, platelet-shaped iron oxide, liquid crystal pigments, coated aluminum oxide pigments and coated silicon dioxide pigments.

In addition to the at least one special-effect pigment the pigment content of the waterborne base coats of the present invention can comprise one or more pigments other than the at least one special-effect pigment. Examples of pigments other than the at least one special-effect pigment are conventional pigments selected from white, colored and black pigments, such as, e.g., conventional inorganic or organic pigments known to the skilled person, for example, titanium dioxide, iron oxide pigments, carbon black, azo pigments, phthalocyanine pigments, quinacridone pigments, pyrrolopyrrol pigments and perylene pigments.

The waterborne base coats of the present invention may also contain fillers, for example, in proportions of 0 to 25 wt.-% relative to the resin solids content of the waterborne base coats. The fillers do not constitute part of the pigment content of the waterborne base coats. Examples of fillers are barium sulfate, kaolin, talcum, silicon dioxide, layered silicates and any mixtures thereof.

The special-effect pigments present in the waterborne base coats of the present invention are generally initially introduced in the form of a conventional commercial aqueous or non-aqueous paste, optionally, combined with preferably water-dilutable organic solvents and additives and then mixed with aqueous binder. Pulverulent special-effect pigments may first be processed with preferably water-dilutable organic solvents and additives to yield a paste.

White, colored and black pigments and/or fillers may, for example, be ground in a proportion of the aqueous binder. Grinding may preferably also take place in a special water-dilutable paste resin. Grinding may be performed in conventional assemblies known to the person skilled in the art. The formulation is then made up with the remaining proportion of the aqueous binder or of the aqueous paste resin.

The waterborne base coats of the present invention contain poly(meth)acrylic acid thickener in a proportion of 0.5 to 2 wt.-%, calculated as solids and relative to the solids content of the waterborne base coats. Poly(meth)acrylic acid thickeners are thickeners known to the person skilled in the art of aqueous paint and coating, for example, copolymers of (meth)acrylic acid and (meth)acrylic acid esters containing polymerized (meth)acrylic acid, for example, in an amount of 30 to 60 by weight. Viscalex® HV 30 from Ciba is an example of a commercially available poly(meth)acrylic acid thickener. The poly(meth)acrylic acid thickeners are used in an at least partially neutralized form in the waterborne base coats, or, after their addition to the waterborne base coats, are at least partially neutralized. Amines or aminoalcohols are particular examples of alkaline neutralizing agents which can be used for partially or totally neutralizing the poly(meth)acrylic acid thickeners.

The waterborne base coats of the present invention contain non-ionically emulsified EVA copolymer wax with a drop point of the wax portion of 80 to 110° C. in a proportion of 2 to 7 wt.-%, calculated as solids and relative to the solids content of the waterborne base coats. To avoid misunderstandings, the 2 to 7 wt.-% include the solids contribution of the non-ionic emulsifier or non-ionic surfactant. The EVA copolymer waxes having a drop point of 80 to 110° C. contain, in particular, 6 to 14 wt.-% of copolymerized vinyl acetate. The weight ratio between non-ionic emulsifier or non-ionic surfactant and the EVA copolymer wax of the non-ionically emulsified EVA copolymer wax is, for example, 0.1:99.9 to 10:90, or, in an embodiment, for example, 0.5:99.5 to 5:95.

The poly(meth)acrylic acid thickener and the non-ionically emulsified EVA copolymer wax with a drop point of the wax portion of 80 to 110° C. may be introduced into the waterborne base coats of the present invention as separate components and/or in the form of an intermediate product containing both additives in combination. Aquatix® 8421 from BYK is an example of such a commercially available intermediate product.

In addition to the poly(meth)acrylic acid thickener and the non-ionically emulsified EVA copolymer wax with a drop point of the wax portion of 80 to 110° C., the waterborne base coats of the present invention may contain conventional paint additives other than poly(meth)acrylic acid thickeners and other than non-ionically emulsified EVA copolymer waxes. Such conventional paint additives may be contained in conventional quantities, for example, of 0.1 to 5 wt.-%, relative to the solids content of the waterborne base coats. Examples of such conventional paint additives include neutralizing agents, antifoaming agents, wetting agents, adhesion promoters, catalysts, levelling agents, anticratering agents and thickeners other than poly(meth)acrylic acid thickeners.

The waterborne base coats of the present invention may contain conventional organic solvents, for example, in a proportion of preferably less than 25 wt.-%, particularly preferably less than 20 wt.-%, based on total waterborne base coat. Examples of such organic solvents are alcohols, for example, propanol, butanol, hexanol; glycol ethers or esters, for example, diethylene glycol di-C1-C6-alkyl ether, dipropylene glycol di-C1-C6-alkyl ether, ethoxypropanol, ethylene glycol monobutyl ether; glycols, for example, ethylene glycol and/or propylene glycol, and the di- or trimers thereof; N-alkylpyrrolidone, such as, for example, N-ethylpyrrolidone; ketones such as methyl ethyl ketone, acetone, cyclohexanone; aromatic or aliphatic hydrocarbons, for example, toluene, xylene or linear or branched aliphatic C6-C12 hydrocarbons.

The waterborne base coats of the present invention can be used to spray-apply the base coat layer of base coat/clear coat two-layer coatings having special-effect colors.

The invention is therefore also related to a process for the production of a base coat/clear coat two-layer coating having a special-effect color, wherein the base coat layer is spray-applied from a waterborne base coat of the present invention onto a substrate. The process comprises the steps:

(1) providing a substrate to be provided with a base coat/clear coat two-layer coating having a special-effect color,
(2) spray-applying a waterborne base coat of the present invention on the substrate to form the base coat layer,
(3) spray-applying a clear coat composition on the base coat layer formed in step (2) to form the clear coat layer, and
(4) jointly curing the base coat layer and the clear coat layer at an object temperature at or above the drop point of the wax portion of the non-ionically emulsified EVA copolymer wax having a drop point of 80 to 110° C.

The substrate provided in process step (1) can be a plastics or a metal substrate. Plastics substrates may have a precoating like a conductive primer layer; metal substrates may have a precoating like a conventional EDC primer layer and, optionally, also a conventional primer surfacer layer. Examples of substrates include in particular automotive bodies and body parts, which typically have a suitable precoating. Automotive bodies may in particular have a precoating consisting of a conventional EDC primer layer or of a conventional EDC primer layer plus a conventional primer surfacer layer. Automotive body metal parts may in particular have a precoating consisting of a conventional EDC primer layer or of a conventional EDC primer layer plus a conventional primer surfacer layer, whereas automotive body plastics parts may in particular have a precoating consisting of a conductive primer layer.

The substrate provided in process step (1) is provided with a base coat/clear coat two-layer coating having a special-effect color by carrying out the wet-on-wet coating process comprising process steps (2) to (4) in the course of which the base coat layer and the clear coat layer both are applied and jointly cured.

In process step (2) the (precoated) substrate is spray-coated with a waterborne base coat of the present invention. Application of the waterborne base coat may be performed by any known spray-application method like, for example, pneumatic spray-application or electrostatically-assisted high-speed rotary atomization. In an embodiment, the spray-application is performed in two spray passes (two subsequent spray operations), the first of which being performed by electrostatically-assisted high-speed rotary atomization and the second by pneumatic spray-application. In a preferred embodiment, the spray-application is performed only by electrostatically-assisted high-speed rotary atomization, which may be performed in two spray passes or even in one single spray pass.

The waterborne base coat is applied in a total dry film thickness of, for example, 7 to 22 µm.

The applied base coat layer is preferably briefly flashed off before process step (3) is performed. The flash-off phase takes, for example, 30 seconds to 10 minutes at an air temperature of 20 to 80° C.

In process step (3), a clear coat composition is spray-applied on the not yet fully cured or even uncured base coat layer formed in process step (2). Application of the clear coat may be performed by any known spray-application method like, for example, pneumatic spray-application or electrostatically-assisted high-speed rotary atomization, the latter spray-application method being the preferred one. The clear coat composition is applied in a total dry film thickness of, for example, 30 to 60 µm.

All known clear coat compositions are in principle suitable. Usable clear coats are here both solvent-containing one-component (1 pack) or two-component (2 pack) clear coats and water-dilutable 1 pack or 2 pack clear coats.

After an optional, but preferred flash-off phase the applied base coat layer and the clear coat layer are jointly cured in process step (4). The joint curing is performed at an object temperature at or above the drop point of the wax portion of the non-ionically emulsified EVA copolymer wax having a drop point of 80 to 110° C. The object temperature is, for example, 80 to 160° C., in particular, 120 to 160° C., and the joint curing is carried out, for example, by baking.

EXAMPLES

Example 1

Preparation of an Aqueous Binder Latex

A reactor was charged with 688 pbw (parts by weight) of deionized water and 16 pbw of Rhodapex EST30 (anionic surfactant available from Rhodia; 30 wt. % in water). The water and surfactant charge was heated to 80° C. under nitrogen atmosphere and held at that temperature throughout the reaction. A first stirred monomer emulsion consisting of 45 pbw of Rhodapex EST30, 349 pbw of deionized water, 270 pbw of methyl methacrylate, 189 pbw of butyl acrylate, 175 pbw of styrene, 36 pbw of hydroxyethyl acrylate, 36 bpw of methacrylic acid and 7 pbw of allyl methacrylate was prepared separately. A solution of 3.2 pbw of ammonium peroxodisulfate (APS) in 100 pbw of deionized water was added to the reactor content and the first monomer emulsion was then added within 90 minutes to the reactor content. After all of the first monomer emulsion was in, the reactor content was held for an additional hour at 80° C., during which a second stirred monomer emulsion consisting of 15 pbw of Rhodapex EST30, 378 pbw of deionized water, 277 pbw of methyl methacrylate, 180 pbw of butyl acrylate, 175 pbw of styrene, 72 pbw of glycidyl methacrylate and 7 pbw of allyl methacrylate and a solution of 13 pbw of 2-amino-2-methyl-1-propanol (90 wt. % in water) in 98 pbw of deionized water were separately prepared. The aqueous 2-amino-2-methyl-1-propanol solution was added slowly to the reaction mixture and then, a solution of 1.1 pbw of ammonium peroxodisulfate (APS) in 70 pbw of deionized water was added slowly to the reactor content. The second monomer emulsion was then added within 90 minutes to the reactor content. After the addition was complete, the reactor content was held at 80° C. for an additional hour. The aqueous binder latex obtained was then cooled to room temperature.

Example 2

Preparation of an Aqueous Polyurethane Binder Dispersion 1005 g of a straight-chain polyester (composed of adipic acid, isophthalic acid and hexanediol having a hydroxyl value of 102 mg KOH/g) were heated to 90° C. and 1.8 g of trimethylolpropane and 393 g of isophorone diisocyanate were added. The reaction was carried out at 90° C. until the NCO value was constant. After cooling to 60° C., a solution of 35.3 g of dimethylol propionic acid, 26.1 g triethylamine and 250 g N-ethylpyrrolidone was added. After heating to 80° C., the reaction temperature was maintained until the NCO value was constant. The batch was mixed with a molar amount, based on the molar NCO-content, of deionized water, and the solution was kept at 80° C., until no more NCO was detectable. The batch was then converted into an aqueous dispersion having a solids content of 35 wt. % by adding deionized water.

Examples 3a to 3b

Preparation of Waterborne Metallic Base Coats

Waterborne metallic base coats 3a to 3b were prepared by mixing the constituents listed in Table 1. Proportions are in pbw. Table 1 also shows dullness data of multi-layer coatings prepared with the waterborne base coats.

TABLE 1

| | Silver-metallic waterborne base coats | |
|---|---|---|
| | 3a **) | 3b *) |
| Constituents: | | |
| BE | 2.5 | 2.5 |
| Aluminum paste [1] | 15 | 15 |
| NEP | 1 | 1 |
| Binder dispersion of Example 2 | 13 | 13 |
| Deionized water | 15 | 10 |
| Aqueous binder latex of Example 1 | 10 | 10 |
| Deionized water | 15 | 10 |
| Layered silicate composition [2] | 0 | 17 |
| Maprenal ® MF 900 [3] | 3 | 3 |
| Cymel ® 325 [4] | 2 | 2 |
| Deionized water | 12.4 | 8.9 |
| Thickener [5] | 0 | 3 |
| Aquatix ® 8421 | 5 | 0 |
| DMEA, 10 wt. % solution in water | 3.5 | 2 |
| BuOH | 2.6 | 2.6 |
| Dullness [6] | 23 | 33 |
| Wa [6] | 18 | 27 |
| Wb [6] | 22 | 24 |

*) comparative example
**) according to the invention
BE, Butoxy ethanol
BuOH, n-Butanol
DMEA, Dimethylethanolamine
NEP, N-Ethyl pyrrolidone
[1] Mixture of 50 pbw BE with 50 pbw Stapa Hydrolan ® IL 2156 from Eckart.
[2] Mixture of 3 pbw Laponite ® RD from Rockwood Additives Ltd., 3 pbw polypropylene glycol 900 and 94 pbw of deionized water.
[3] Melamine resin from Surface Specialties.
[4] Melamine resin from Cytec.
[5] Mixture of 33 pbw Viscalex HV 30 from Allied Colloids, 2.5 pbw DMEA and 64.5 pbw of deionized water.
[6] The water-borne base coats were each applied by electrostatically-assisted high-speed rotary atomization in one single spray pass to steel test panels provided with a precoating consisting of EDC primer and primer surfacer in 12 µm dry film thickness. After flashing-off for 5 minutes at 20° C. and additional 5 minutes at 80° C. the test panels were each spray coated with a commercial two-component polyurethane clear coat in 40 µm dry film thickness and after flashing-off for 5 minutes at 20° C. baked for 20 minutes at 140° C. object temperature. Dullness, Wa and Wb values were determined on the clear coat surface with the measuring device Wavescan DOI from BYK-Gardner.

What is claimed is:
1. A waterborne base coat having a special-effect color and which contains aqueous microgel as binder, 0.5 to 2 wt.-% of poly(meth)acrylic acid thickener and 2 to 7 wt.-% of non-ionically emulsified EVA copolymer wax with a drop point of the wax portion of 80 to 110° C., the wt.-% in each case calculated as solids and relative to the solids content of the waterborne base coat.

2. The waterborne base coat of claim 1, wherein the aqueous microgel totals 20 to 70 wt.-% of the binder solids of the waterborne base coat.

3. The waterborne base coat of claim 1, wherein the aqueous microgel totals 20 to 50 wt.-% of the binder solids of the waterborne base coat.

4. The waterborne base coat of claim 1, wherein the EVA copolymer wax having a drop point of 80 to 110° C. contains 6 to 14 wt.-% of copolymerized vinyl acetate.

5. The waterborne base coat of claim 1 containing a crosslinking agent selected from the group consisting of free polyisocyanates, blocked polyisocyanates, amino resins and any combinations thereof.

* * * * *